(12) United States Patent
Shieh

(10) Patent No.: US 12,403,527 B2
(45) Date of Patent: Sep. 2, 2025

(54) MOLDING APPARATUS

(71) Applicant: Kung-Ping Shieh, Kaohsiung (TW)

(72) Inventor: Kung-Ping Shieh, Kaohsiung (TW)

(73) Assignee: Zenith Troop Industrial Co., Ltd., Kaohsiung (TW)

( * ) Notice: Subject to any disclaimer, the term of this patent is extended or adjusted under 35 U.S.C. 154(b) by 137 days.

(21) Appl. No.: 18/386,583

(22) Filed: Nov. 2, 2023

(65) Prior Publication Data
US 2024/0116225 A1    Apr. 11, 2024

(51) Int. Cl.
*B22D 17/00*    (2006.01)
*B22C 9/06*    (2006.01)
(Continued)

(52) U.S. Cl.
CPC ............ *B22D 17/002* (2013.01); *B22C 9/064* (2013.01); *B22D 17/229* (2013.01);
(Continued)

(58) Field of Classification Search
CPC .... B22D 17/12; B22D 17/2015; B22D 17/22; B22D 17/26; B22D 17/30; B22D 39/02; B29C 45/73; B29C 45/26; B29C 43/04; B29C 45/27; B29C 2945/7604; B29C 33/26; B29C 45/04; B29C 45/32; B29C 45/322; B29C 2045/0094; B29C 43/18; B29C 45/03; B29C 45/0433; B29C 45/0441; B29C 45/14; B29C 45/1756; B29C 45/1761; B29C 45/2681; B29C 45/4005; B29C 45/561; B29C 45/76; B29C 2043/3676; B29C 2045/1765; B29C 2045/2683; B29C 2945/76531; B29C 31/006; B29C 33/34; B29C 45/0416; B29C 45/045; B29C 45/07; B29C 45/1628; B29C 45/2602; B29C 45/34; B29C 2045/0475; B29C 2045/7393; B29C 2945/76177; B29C 2945/76585; B29C 33/06; B29C 43/34; B29C 43/361; B29C 45/1615; B29C 45/263; B29C 45/2673; B29C 45/2708; B29C 45/64; B29C 45/72; B29C 45/78; B29C 2043/3433; B29C 2043/3602; B29C 2043/3621; B29C 2043/5833; B29C 2045/564; B29C 2945/76227; B29C 2945/76568; B29C 2945/76732; B29C 33/202; B29C 33/22; B29C 43/36; B29C 43/58; B29C 45/02; B29C 45/0408; B29C 45/06; B29C 45/12; B29C 45/1635; B29C 45/1671; B29C 45/28; B29C 45/7312; B29C 2033/207; B29C 2035/0811; B29C 2043/3272; B29C 2043/3615; B29C 2043/465; B29C 2043/467;
(Continued)

(56) References Cited

U.S. PATENT DOCUMENTS

2013/0277005 A1* 10/2013 Sasaki .................. B22D 17/24
164/137

* cited by examiner

*Primary Examiner* — Armand Melendez

(57) ABSTRACT

An apparatus for molding process includes a mount including a base, a support on the base, first and second side columns, and a mounting member moveably on tops of the first and second columns; pneumatic first and second half molding assemblies for forming a mold; and first and second auxiliary devices cooperating with a die to insert the mold for molding. There are further provided second cooling devices, first and second lifting devices, first and second lowering devices, and a control device.

3 Claims, 21 Drawing Sheets

(51) Int. Cl.
  *B22D 17/22* (2006.01)
  *B29C 45/04* (2006.01)
  *B29C 45/26* (2006.01)
  *B29C 45/27* (2006.01)
  *B29C 45/73* (2006.01)
  *B29C 45/80* (2006.01)

(52) U.S. Cl.
  CPC ...... *B29C 45/0416* (2013.01); *B29C 45/2602* (2013.01); *B29C 45/2701* (2013.01); *B29C 45/73* (2013.01); *B29C 45/80* (2013.01)

(58) Field of Classification Search
  CPC .... B29C 2043/5808; B29C 2045/0086; B29C 2045/14942; B29C 2045/1685; B29C 2045/1687; B29C 2045/7343; B29C 2045/7356; B29C 2791/008; B29C 33/10; B29C 33/36; B29C 43/222; B29C 43/245; B29C 43/28; B29C 43/46; B29C 43/50; B29C 43/52; B29C 44/1271; B29C 44/14; B29C 45/0025; B29C 45/14016; B29C 45/1634; B29C 45/1679; B29C 45/1703; B29C 45/174; B29C 45/1759; B29C 45/2725; B29C 45/30; B29C 45/332; B29C 45/37; B29C 45/38; B29C 45/40; B29C 45/401; B29C 45/42; B29C 45/46; B29C 45/56; B29C 45/568; B29C 45/641; B29C 45/68; B29C 48/0011; B29C 48/142; B29C 48/146; B29C 48/30; B29C 48/35; B29C 2033/023; B29C 2043/181; B29C 2043/182; B29C 2043/3211; B29C 2043/3283; B29C 2043/3605; B29C 2043/3628; B29C 2043/366; B29C 2045/0027; B29C 2045/0425; B29C 2045/135; B29C 2045/14663; B29C 2045/14934; B29C 2045/1709; B29C 2045/1767; B29C 2045/1788; B29C 2045/1795; B29C 2045/2685; B29C 2045/2717; B29C 2045/2729; B29C 2045/2732; B29C 2045/2886; B29C 2045/308; B29C 2045/384; B29C 2045/4094; B29C 2045/445; B29C 2045/569; B29C 2045/664; B29C 2791/007; B29C 2945/76056; B29C 2945/76545; B29C 2949/0715; B29C 31/042; B29C 33/0022; B29C 33/02; B29C 33/04; B29C 33/12; B29C 33/20; B29C 33/306; B29C 33/3842; B29C 33/48; B29C 33/68
  See application file for complete search history.

MOLDING APPARATUS

BACKGROUND OF THE INVENTION

1. Field of the Invention

The invention relates to molding and more particularly to a molding apparatus having improved characteristics.

2. Description of Related Art

Conventional molding apparatuses are disadvantageous because they are complicated in components and prone to malfunction; quality of products is poor; and may hurt employees in operation if sufficient care is not taken.

Thus, the need for improvement still exists.

SUMMARY OF THE INVENTION

It is therefore one object of the invention to provide a molding apparatus comprising a mount including a base, a support provided on a center of a top of the base, first and second columns provided on two sides of the top of the base, and a mounting member moveably provided on tops of the first and second columns; a first half molding assembly provided on the base and between the support and the first column, the first half molding assembly including a first half-circular member having a first half sprue, and a first pneumatic cylinder contacting the first half-circular member for moving the first half-circular member; a second half molding assembly provided on the base and between the support and the second column, the second half molding assembly including a second half-circular member having a second half sprue, and a second pneumatic cylinder contacting the second half-circular member for moving the second half-circular member wherein the first and second half-circular members are configured to move toward each other form a circular mold on the support, the first and second half sprues form a sprue of the circular mold, and the first and second pneumatic members are configured to activate in synchronism to separate the circular mold; a die provided on a center of the mounting member and including a block at an end and a pneumatic cylinder downward extending to upward or downward move the block; a first auxiliary device provided on an underside of the mount and including a first lateral moving member for moving the first auxiliary device toward the die or away from the die, a first lifting member adjacent to the die, a first L-shaped arm provided on the first lifting member and configured to move upward to engage with the die or downward to disengage from the die, and a first shaping member provided on an underside of the first L-shaped arm; a second auxiliary device provided on the underside of the mount and including a second lateral moving member for moving the second auxiliary device toward the die or away from the die, a second lifting member adjacent to the die, a second L-shaped arm provided on the second lifting member and configured to move upward or downward, and a second shaping member provided on an underside of the second L-shaped arm wherein the first and second shaping members and the block are configured to move into the circular mold; first and second cooling devices are provided in the base under the first half molding assembly and the second half molding assembly respectively for cooling the circular mold; first and second lifting devices provided on two sides of a top of the mounting member respectively wherein the first and second lifting devices are configured to move the mounting member along the first and second columns; first and second lowering devices provided on two sides of an underside of the base respectively wherein the first and second lowering devices are configured to lift or lower the base; and a control device electrically connected to the first and second half molding assemblies, the die, the first and second auxiliary devices, the first and second cooling devices, the first and second lifting devices, and the first and second lowering devices respectively.

The above and other objects, features and advantages of the invention will become apparent from the following detailed description taken with the accompanying drawings.

DETAILED DESCRIPTION OF THE INVENTION

Figure 1:
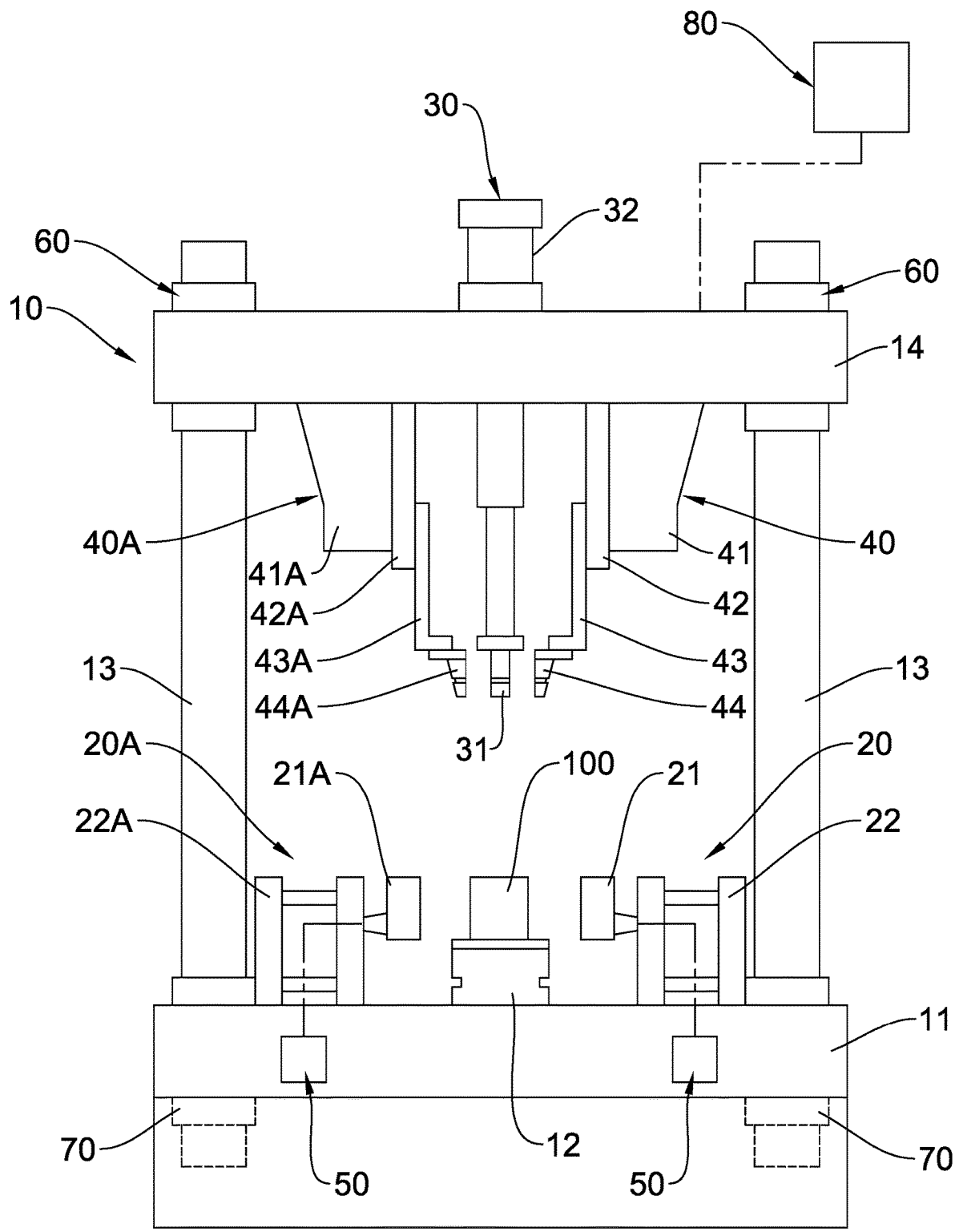
FIG. 1 is a schematic front view of a molding apparatus according to a first preferred embodiment of the invention.
Figure 2:
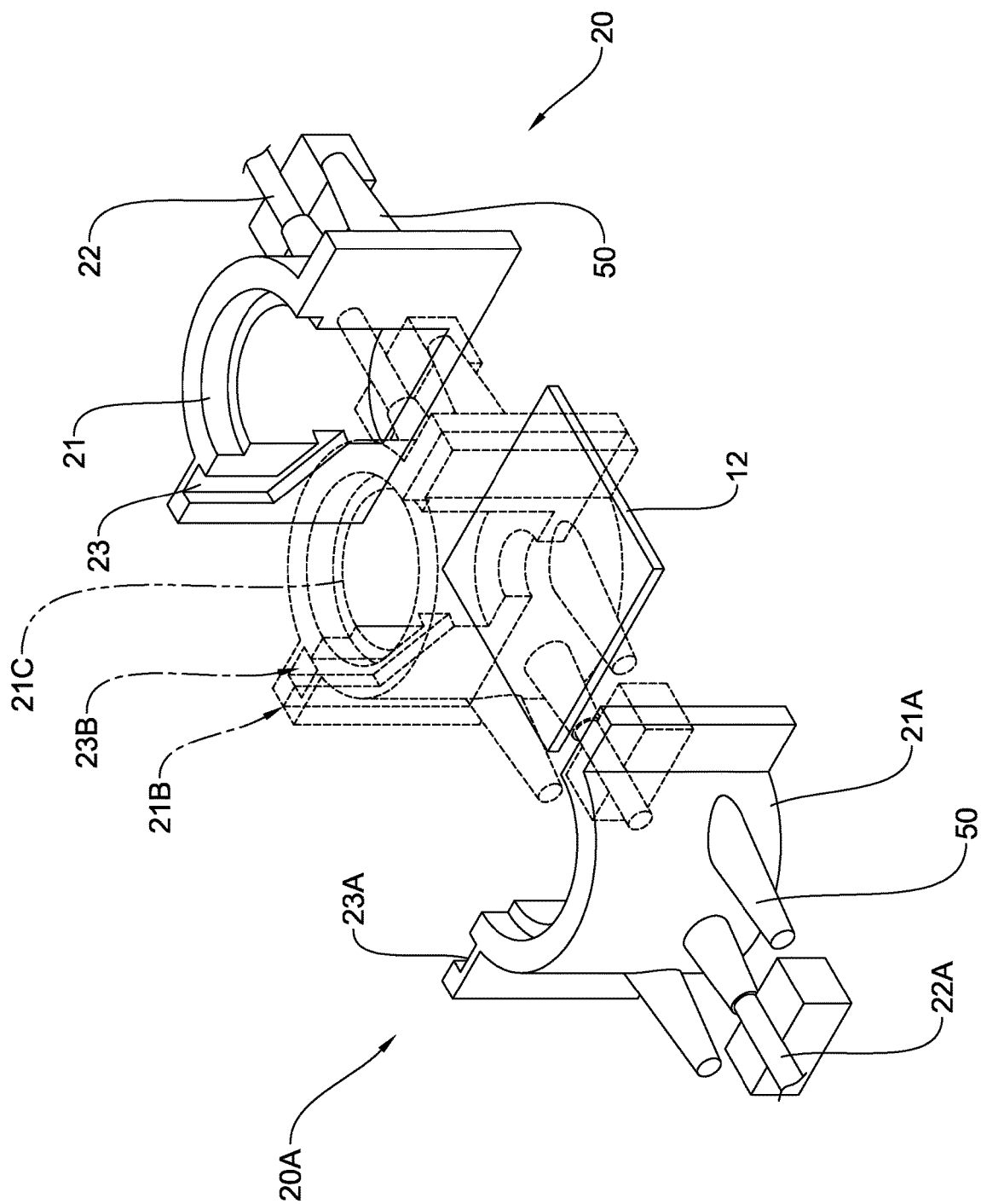
FIG. 2 schematically depicts opening and closing of the half molding assemblies.
Figure 3:
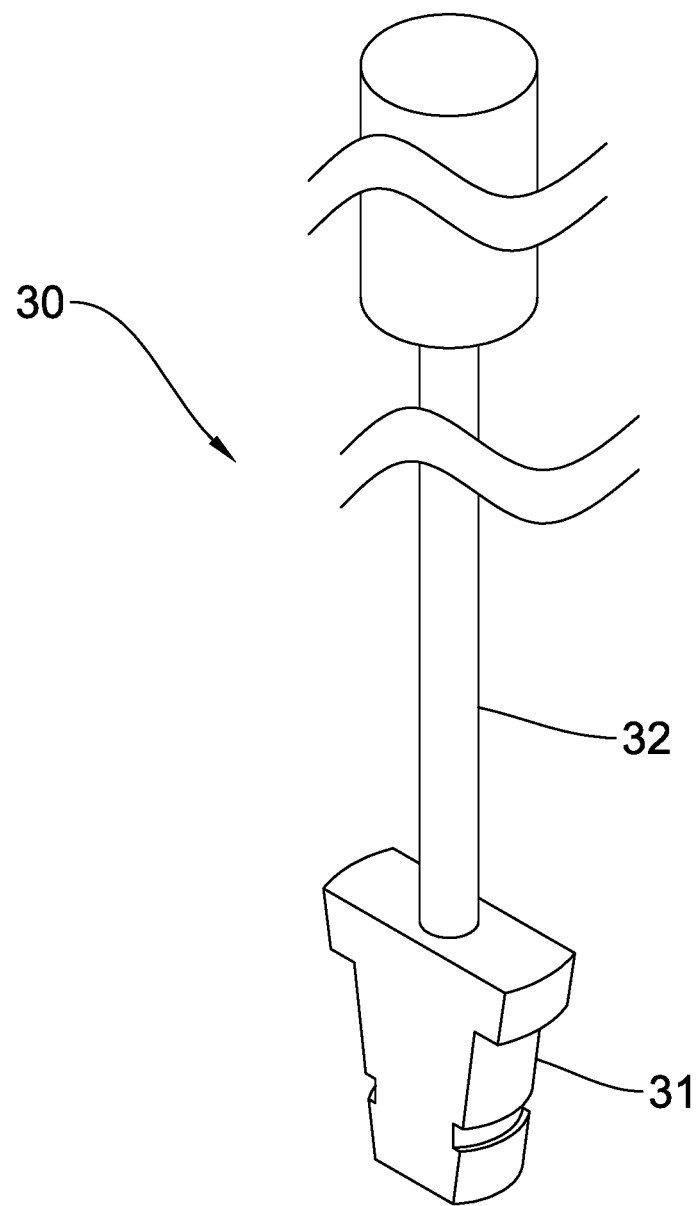
FIG. 3 is a schematic perspective view of the die.
Figure 4:
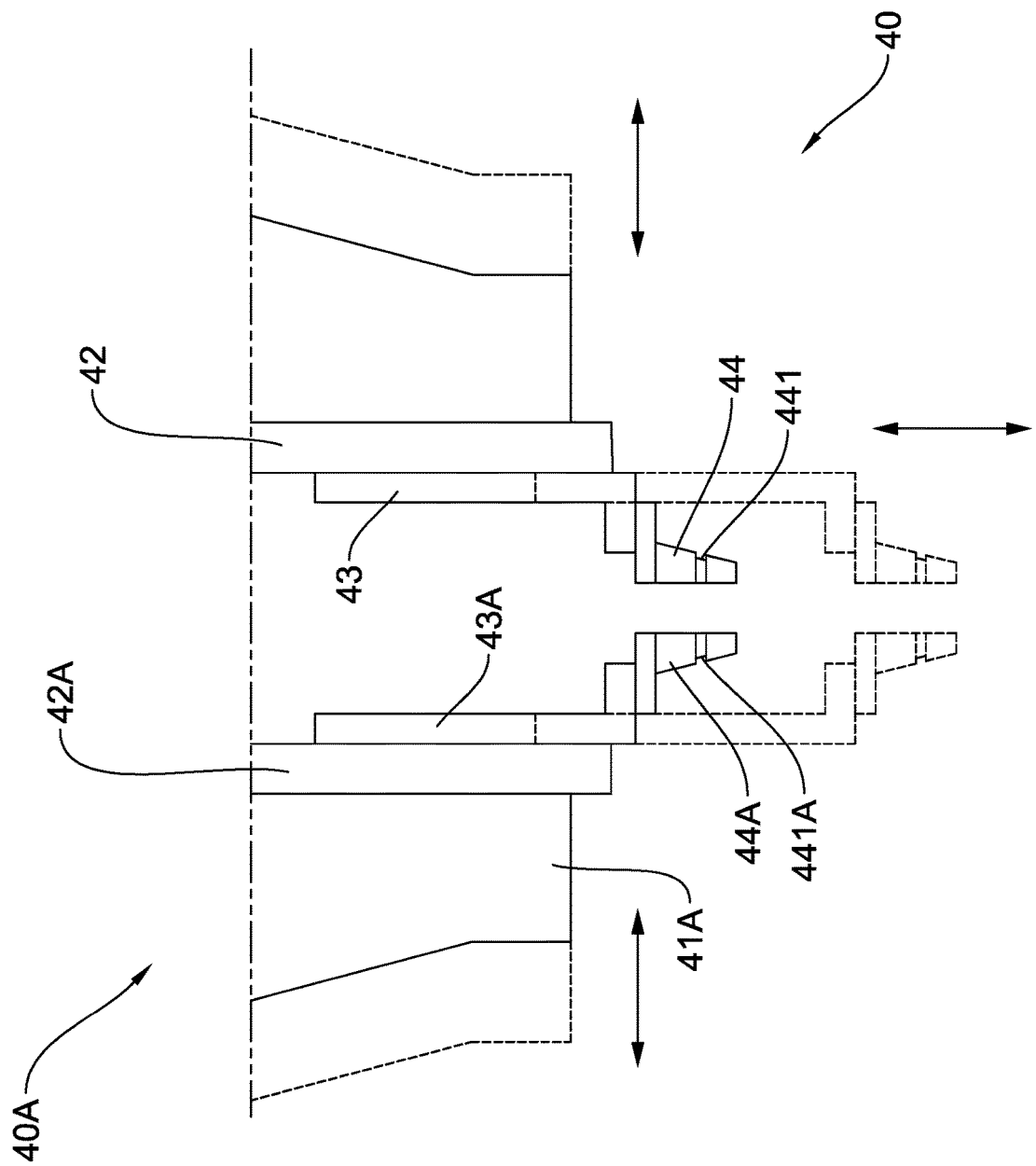
FIG. 4 schematically depicts the auxiliary devices.
Figure 5:
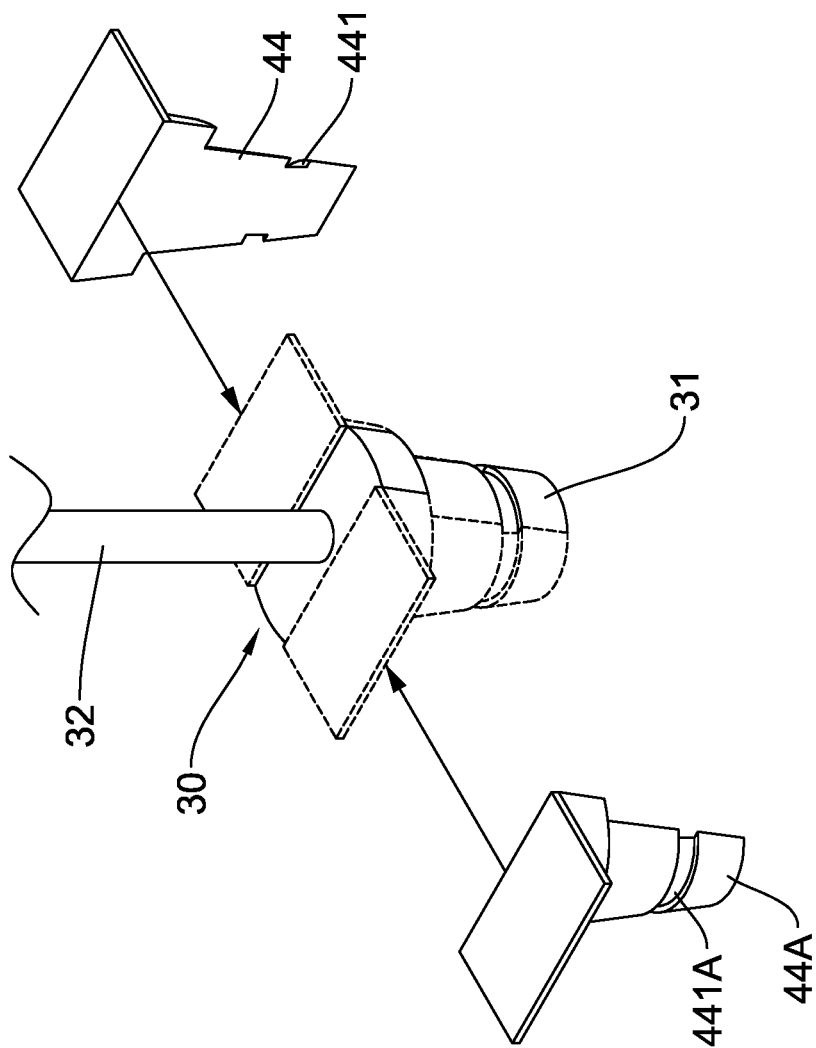
FIG. 5 schematically depicts the forming of a complete tool consisting of the die and the shaping members.
Figure 6:
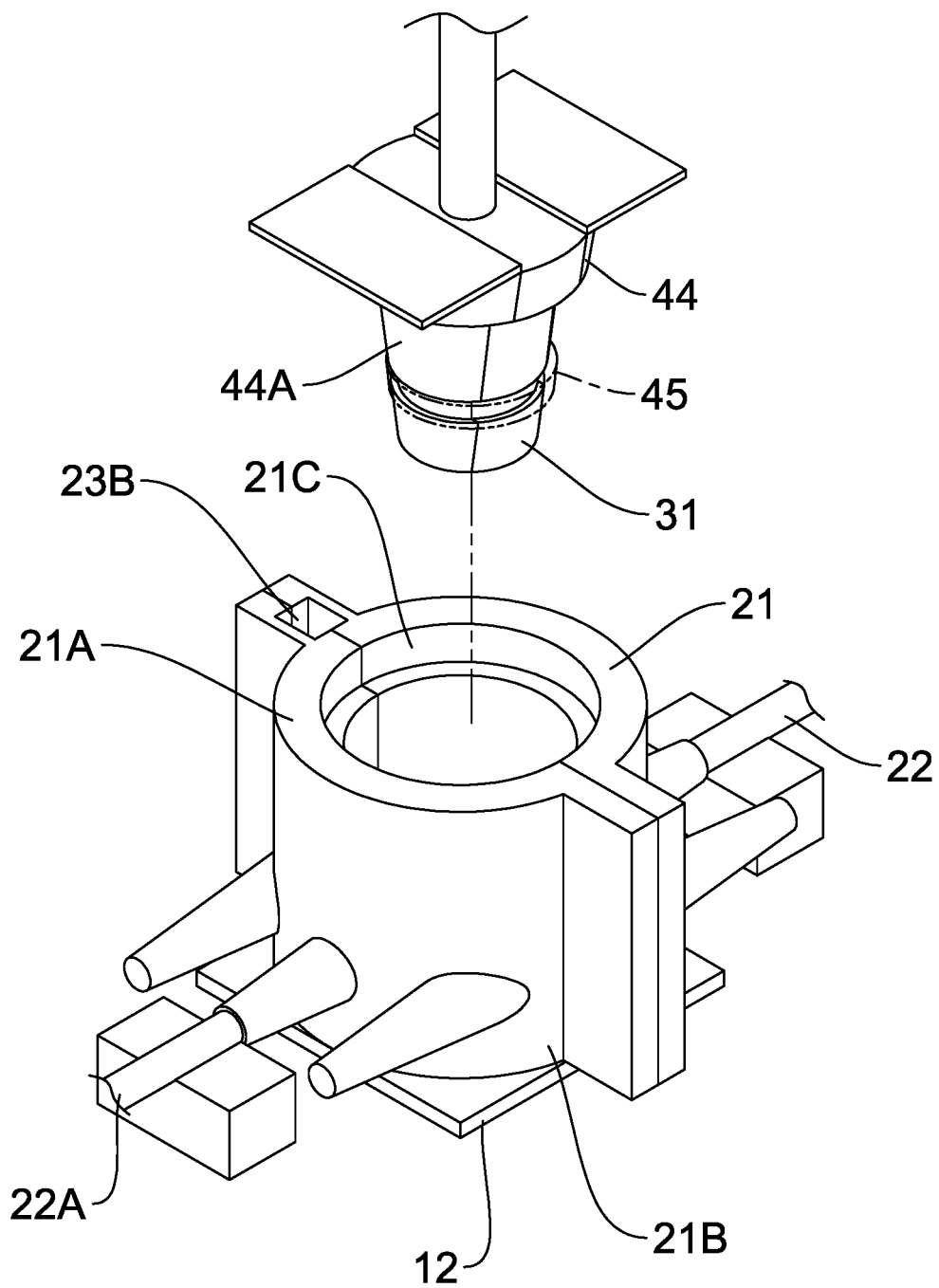
FIG. 6 schematically depicts the tool to be inserted into the circular mold.
Figure 7:
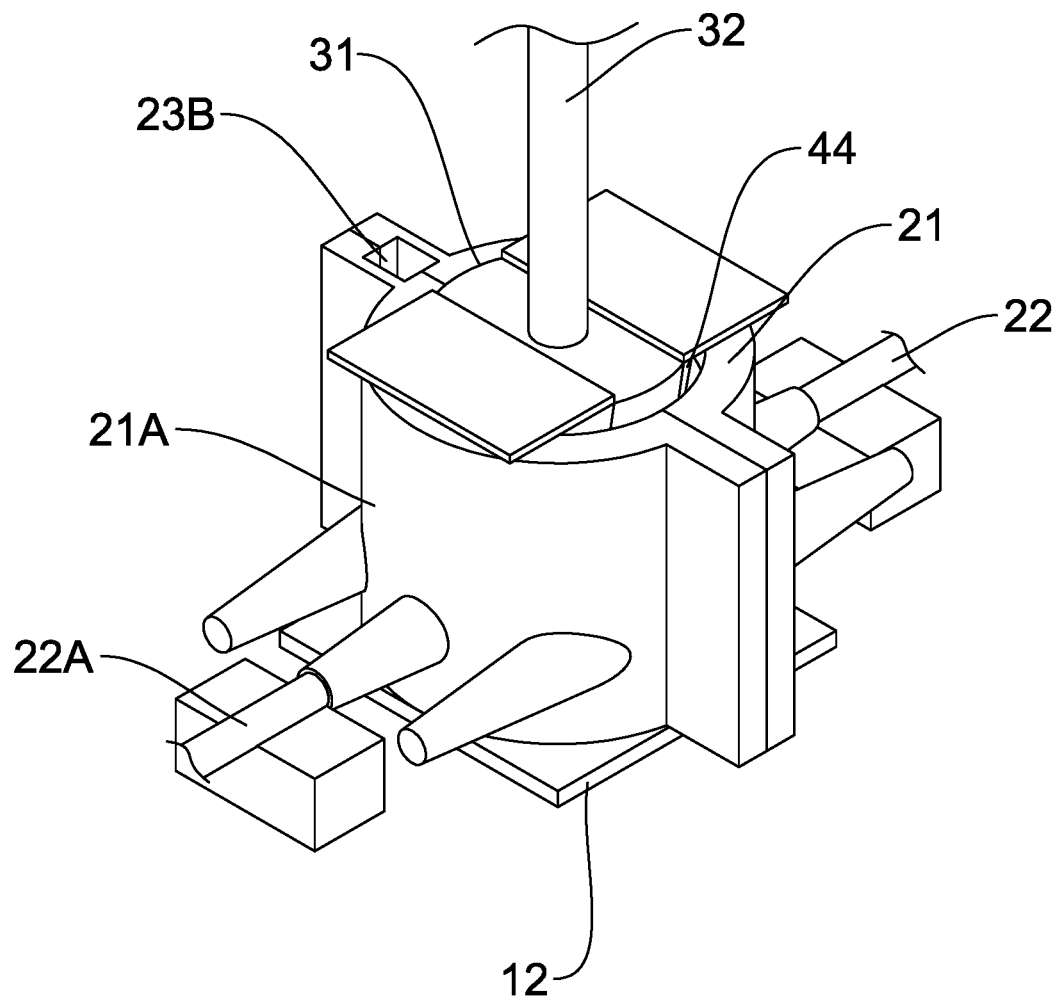
FIG. 7 is a perspective view of the tool inserted into the circular mold.
Figure 8:
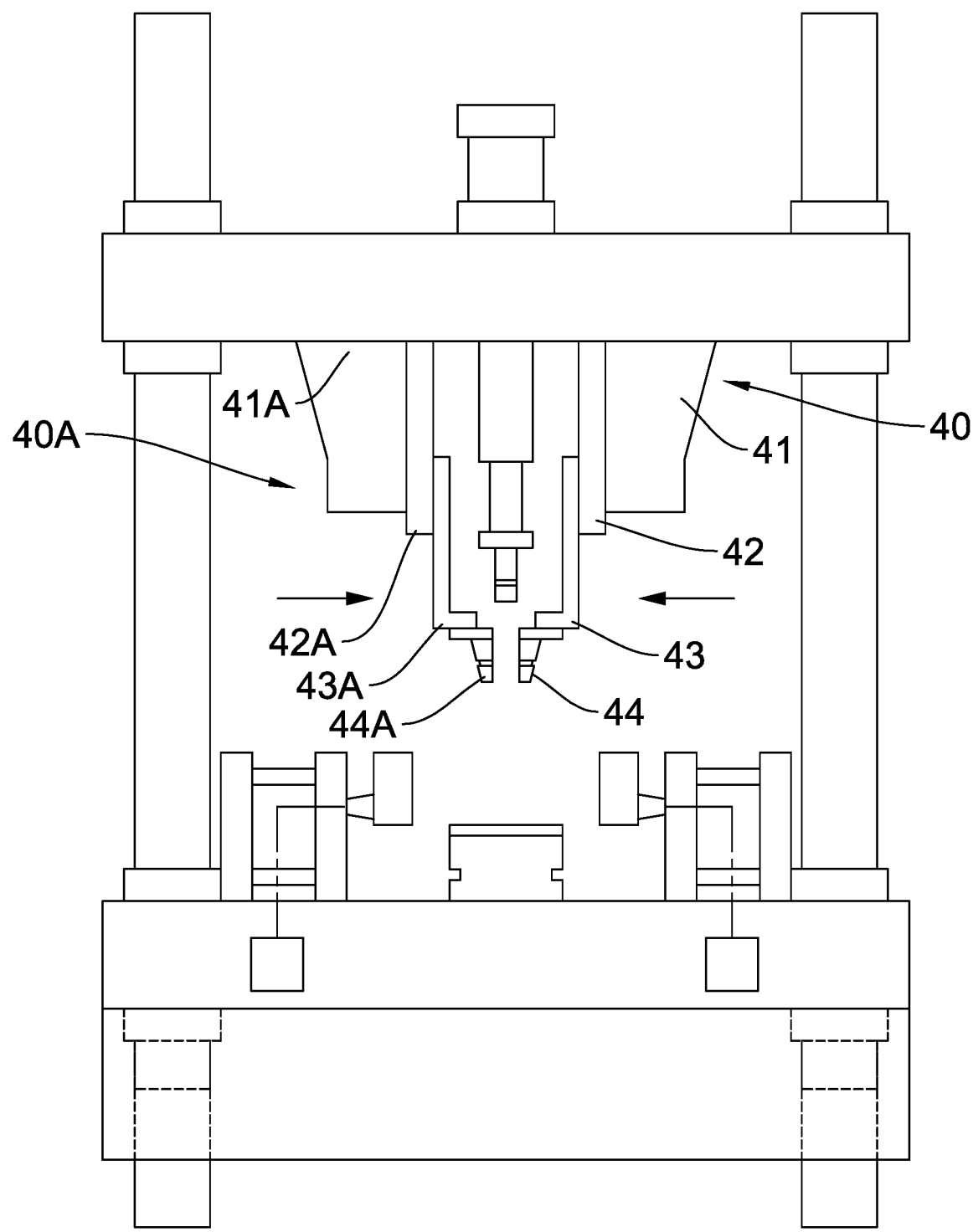
FIG. 8 is a view similar to FIG. 1 showing movements of the auxiliary devices.
Figure 9:
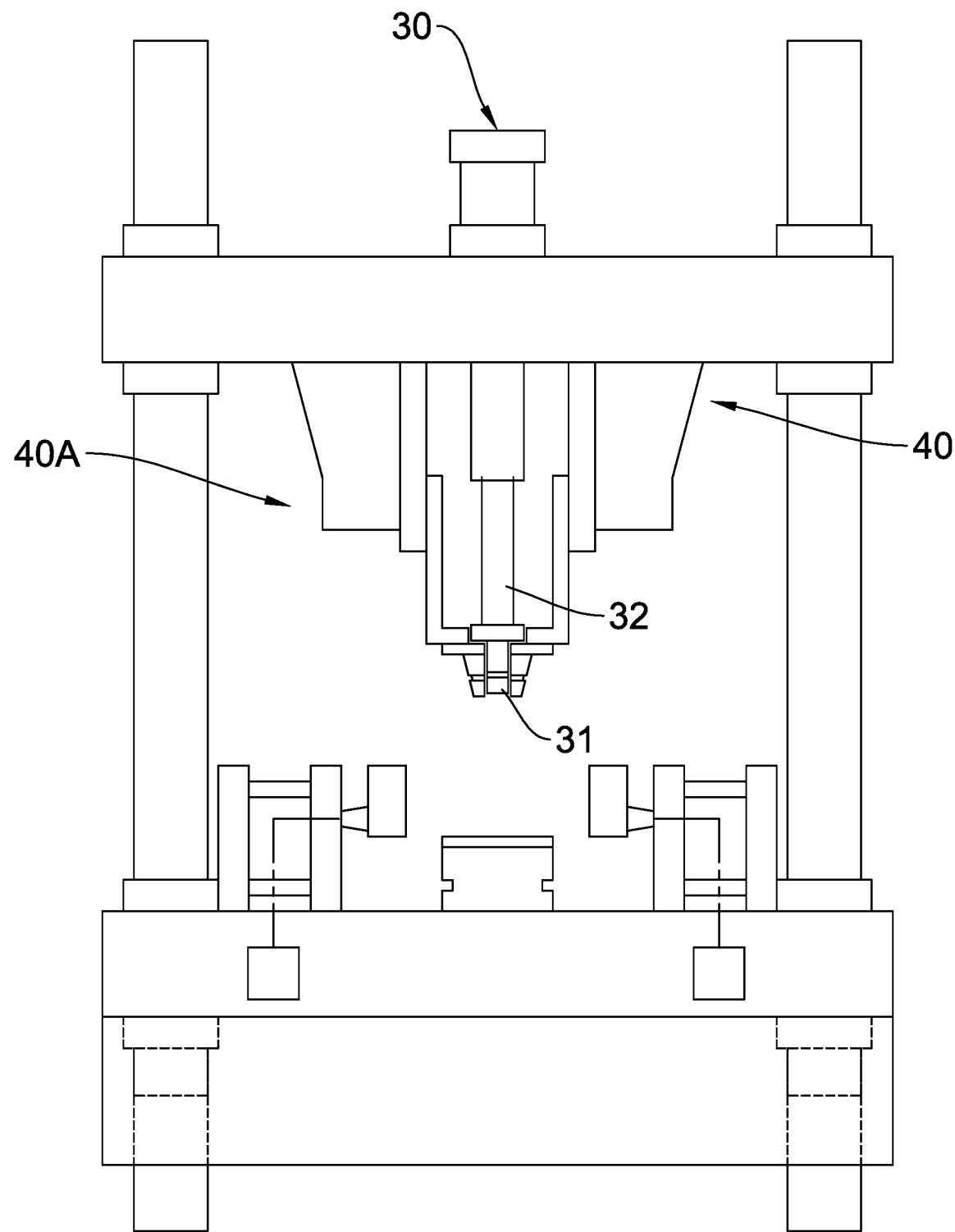
FIG. 9 is a view similar to FIG. 8 showing movement of the die.
Figure 10:
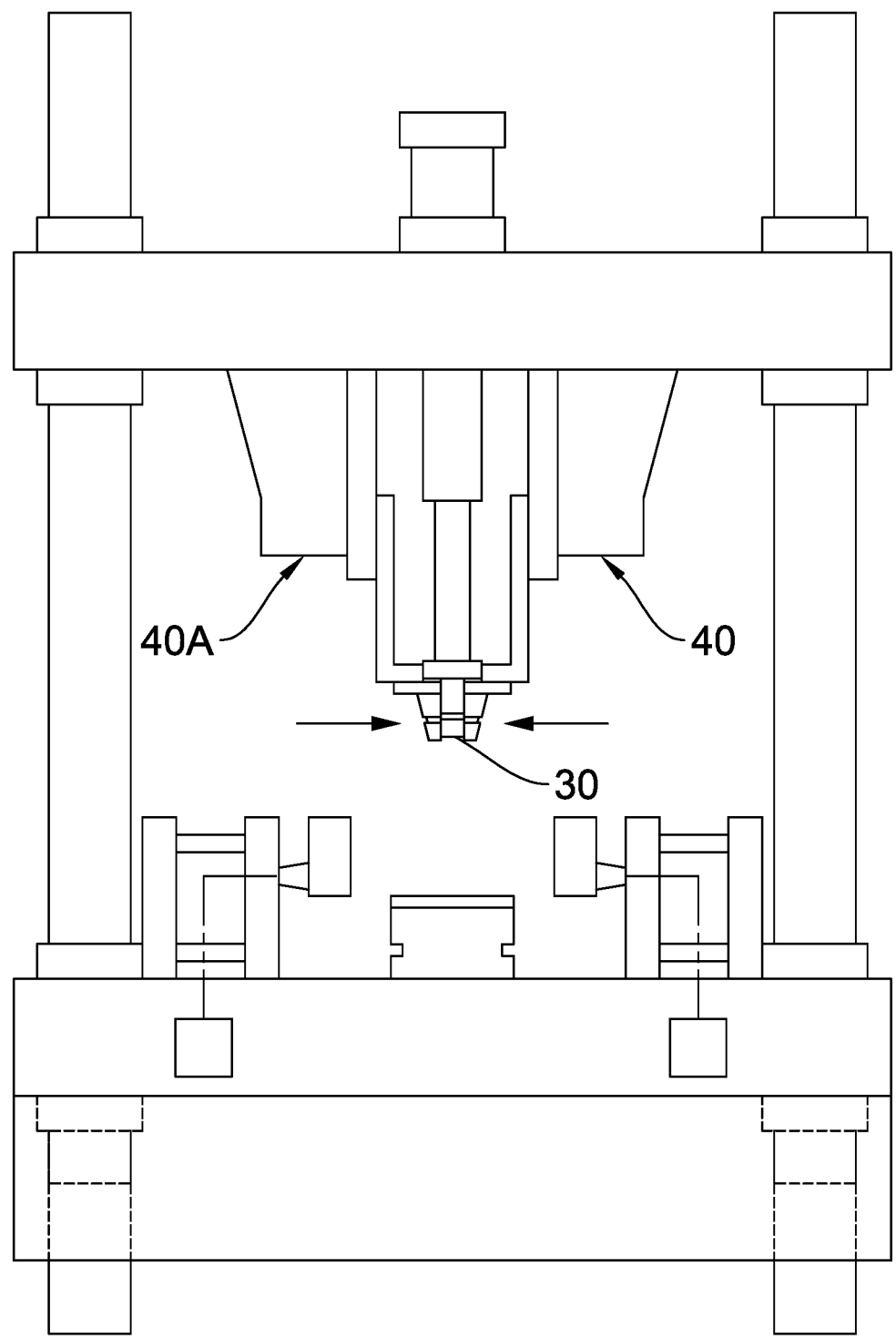
FIG. 10 is a view similar to FIG. 9 showing a joining of the auxiliary devices and the die.
Figure 11:
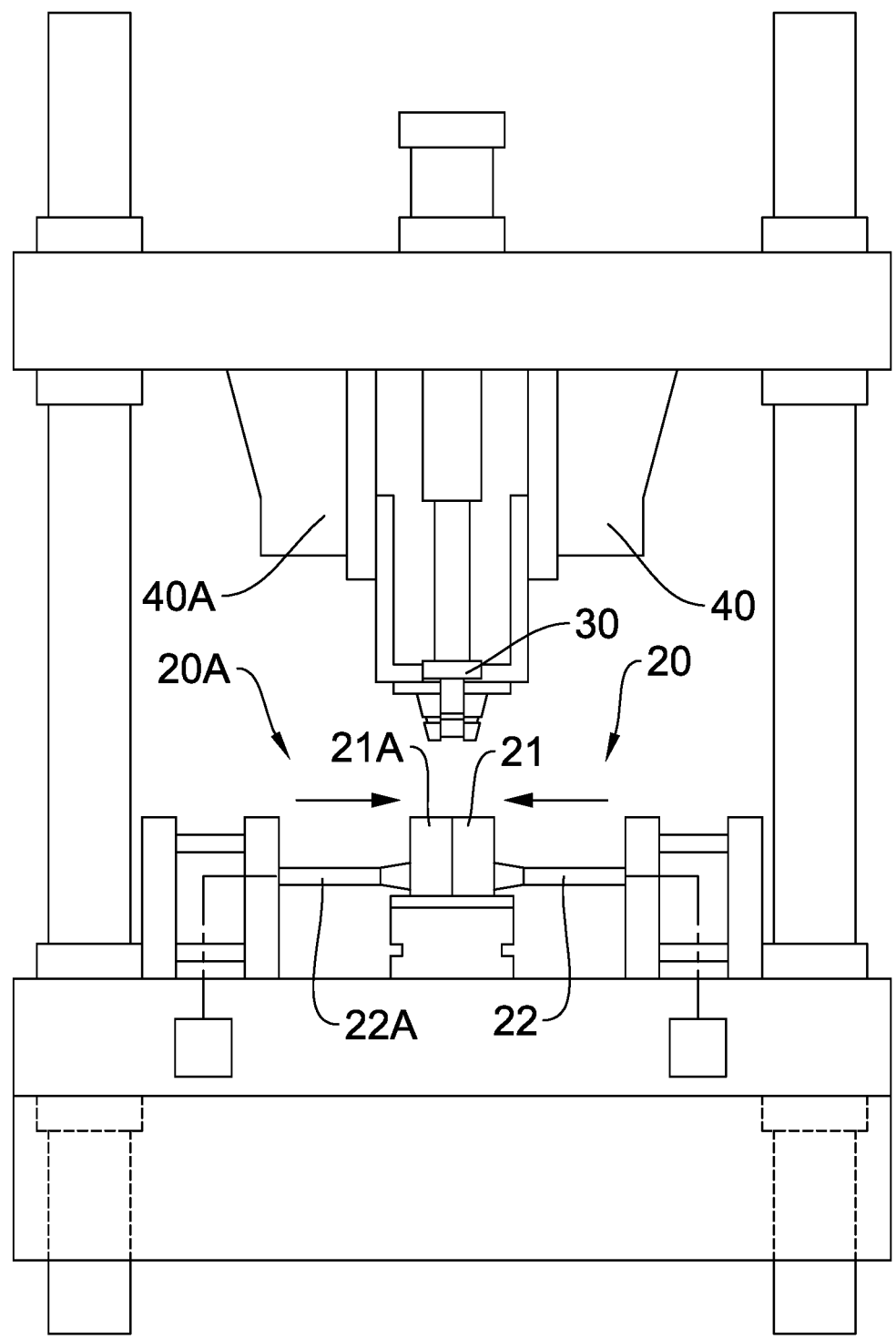
FIG. 11 is a view similar to FIG. 10 showing movements of the pneumatic cylinders of the half molding assemblies.
Figure 12:
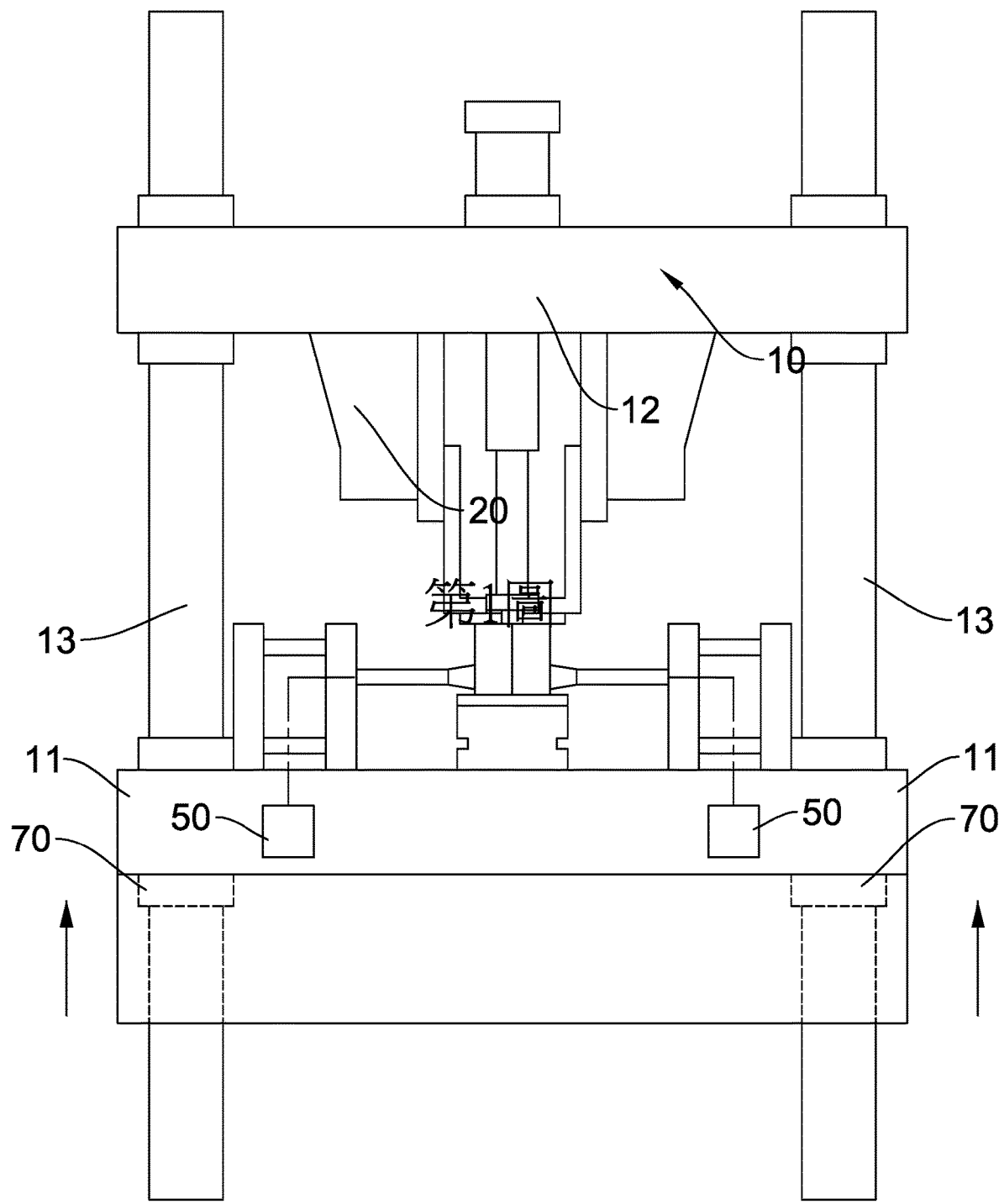
FIG. 12 is a view similar to FIG. 11 showing movements of the lowering devices.
Figure 13:
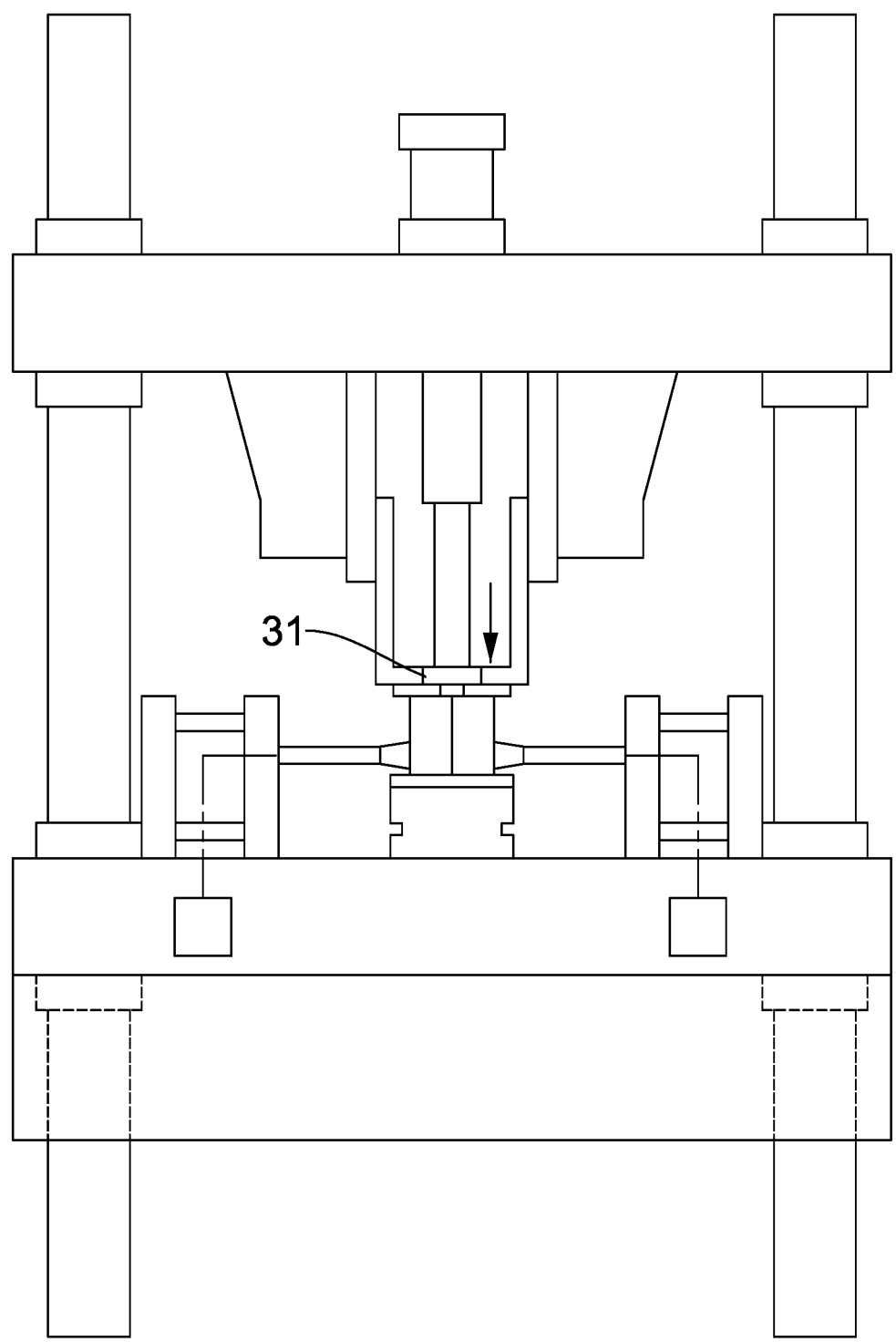
FIG. 13 is a view similar to FIG. 12 showing the tool consisting of the die and the shaping members inserted into the circular mold.
Figure 14:
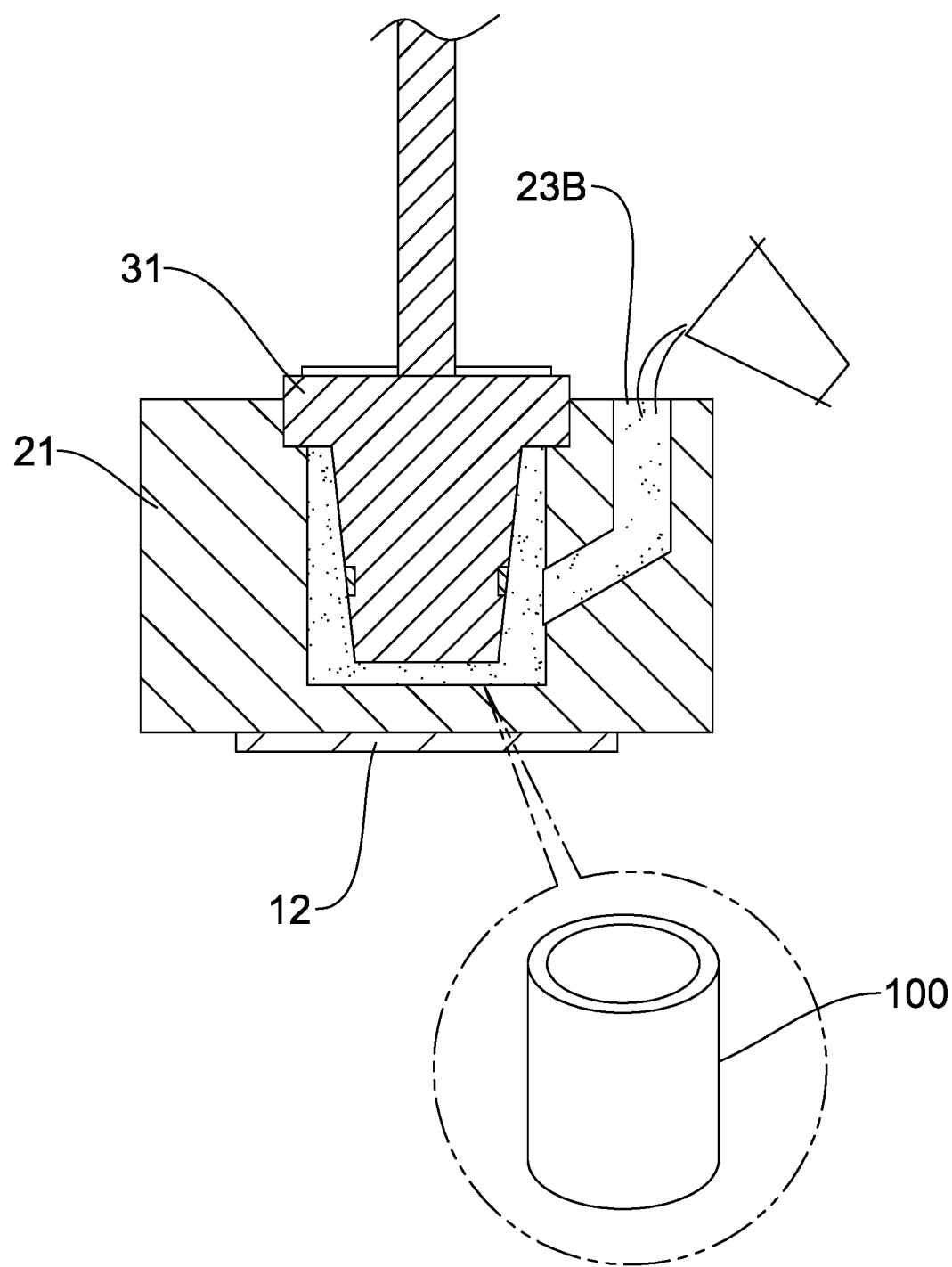
FIG. 14 is a longitudinal sectional view showing the molten metal being poured into the sprue in a molding process.
Figure 15:
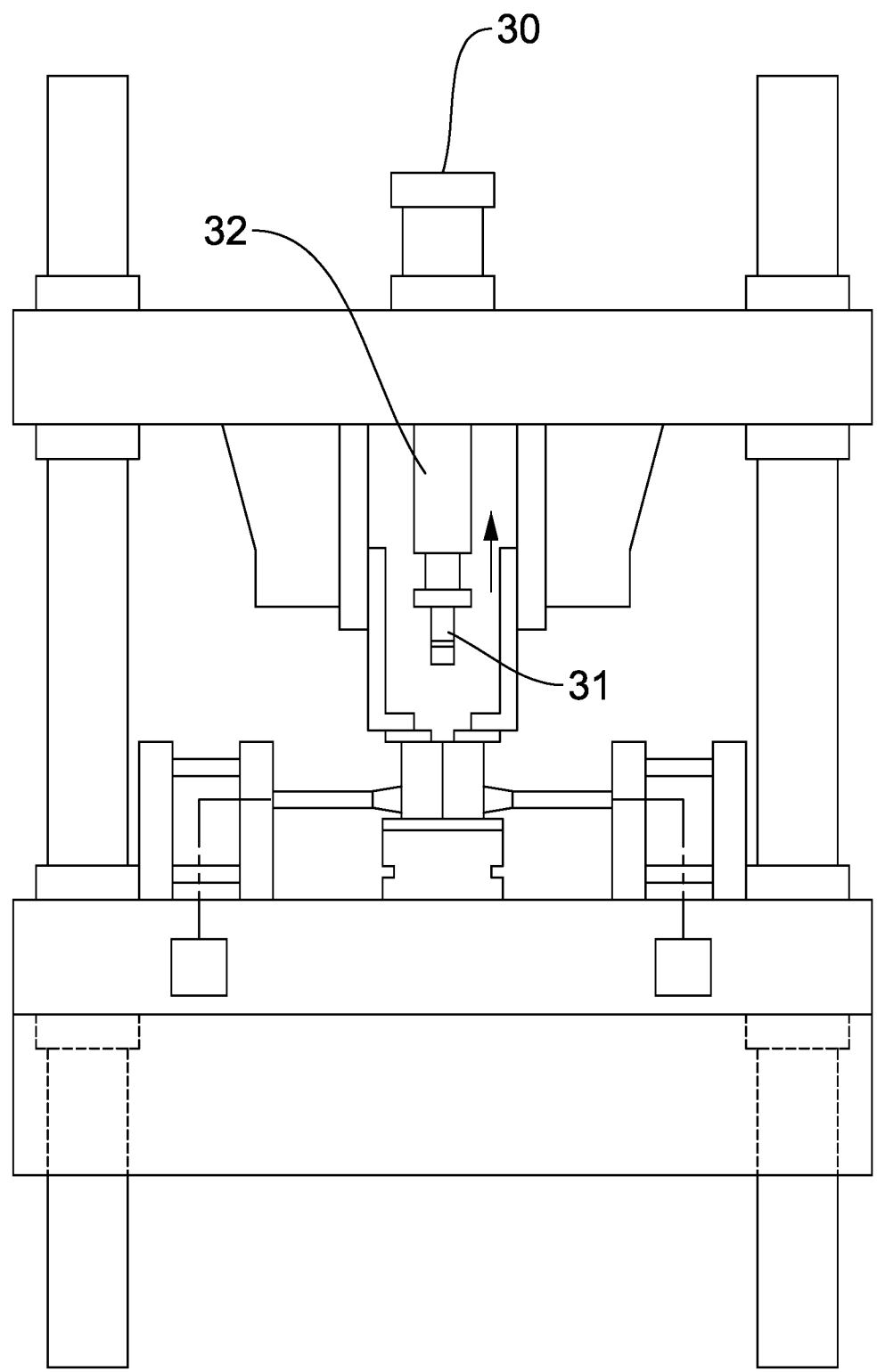
FIG. 15 is a view similar to FIG. 13 showing the tool consisting of the die and the shaping members disengaged from the circular mold.
Figure 16:
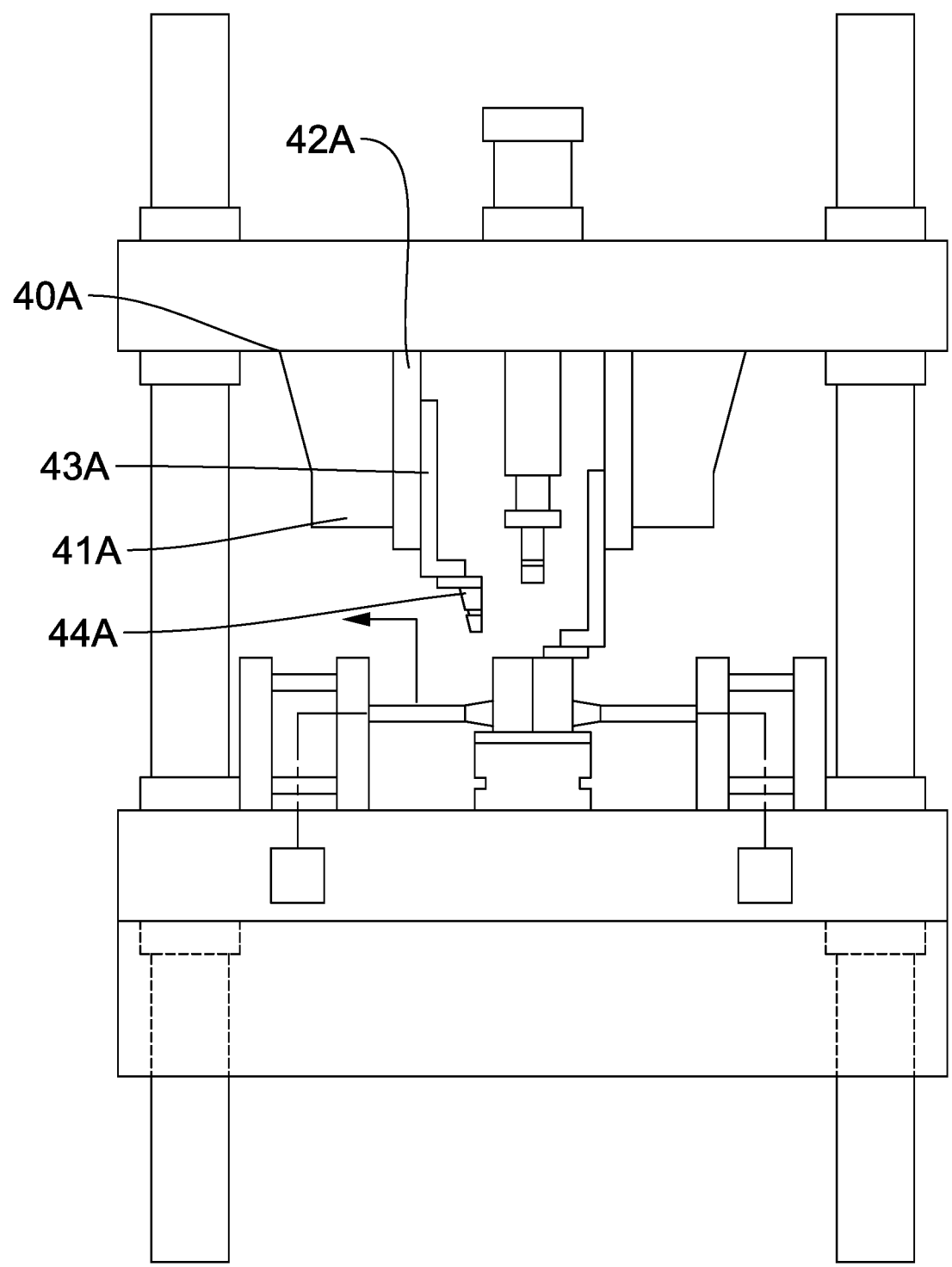
FIGS. 16, 17, 18 and 19 are views similar to FIG. 15 showing steps of returning the components to their original positions after the molding process respectively.
Figure 17:
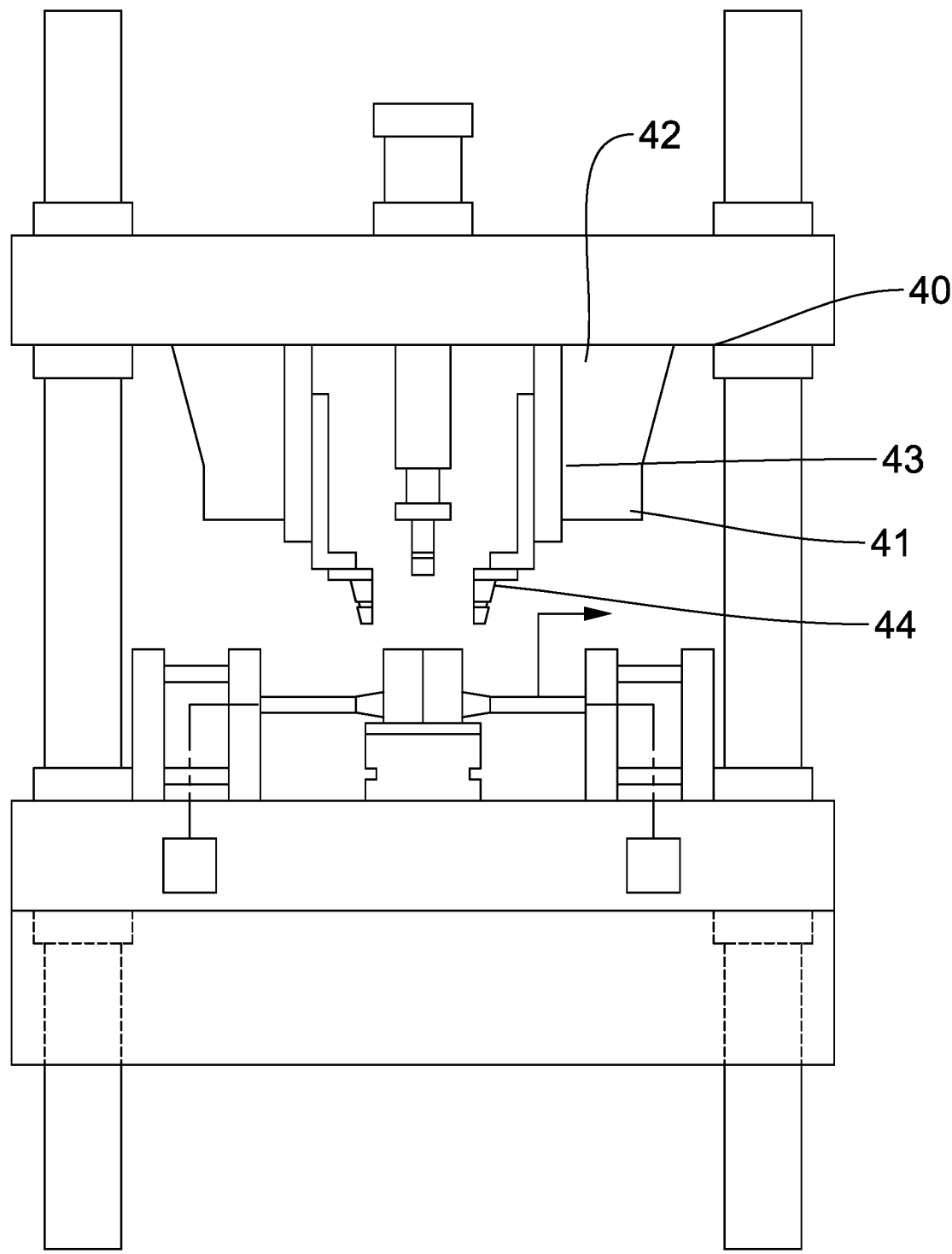
Figure 18:
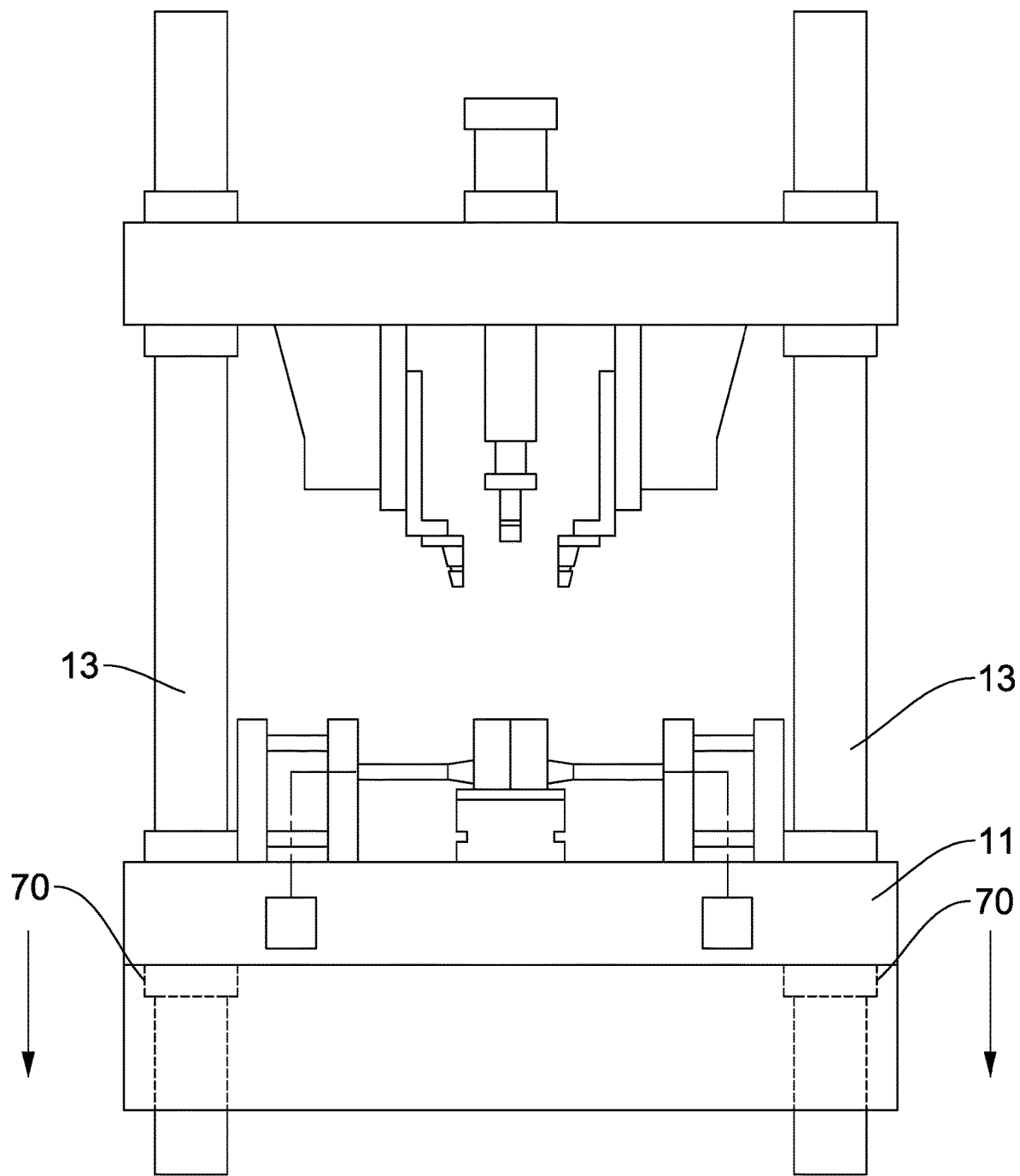
Figure 19:
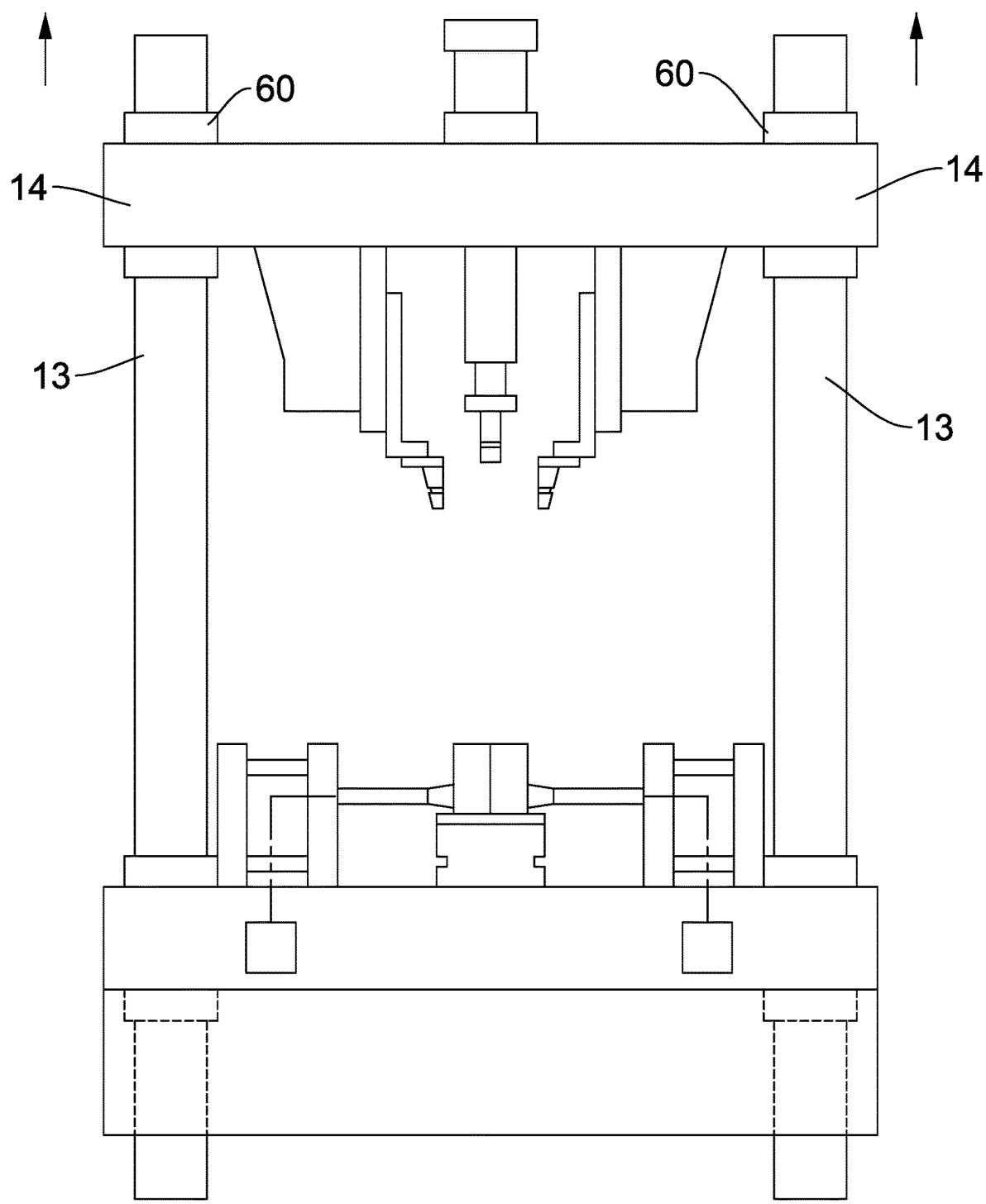
Figure 20:
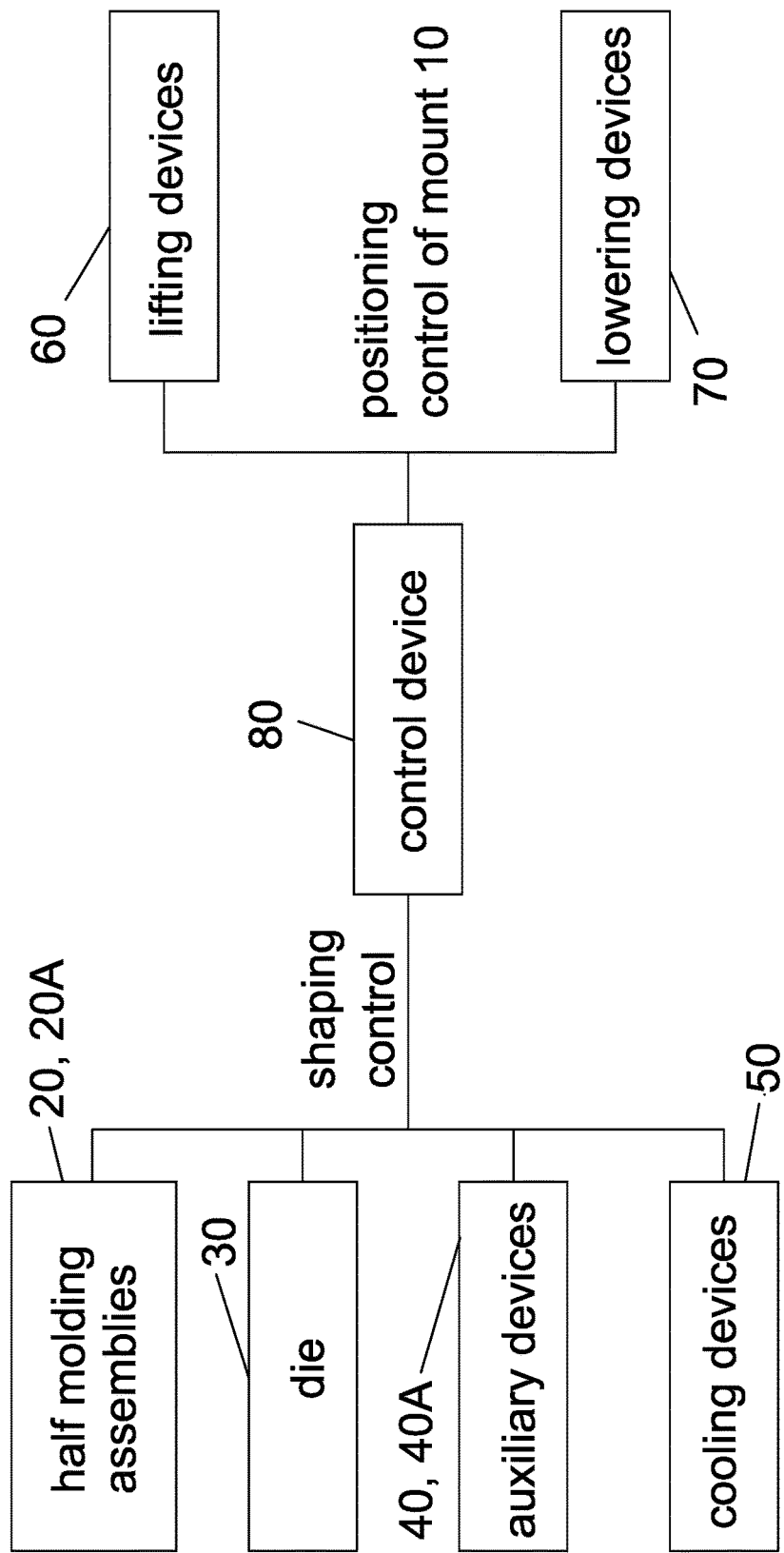
FIG. 20 is a block diagram of the molding apparatus.

Referring to FIGS. 1 to 20, a molding apparatus in accordance with a first preferred embodiment of the invention comprises a mount 10, two half molding assemblies 20, 20A, a die 30, two auxiliary devices 40, 40A, two cooling devices 50, two lifting devices 60, two lowering devices 70, and a control device 80 as detailed below.

The mount 10 includes a base 11, a support 12 provided on a center of a top of the base 11, two columns 13 provided on two sides of the top of the base 11, and a mounting member 14 moveably provided on tops of the columns 13.

The half molding assembly 20A is provided on the base 11 and between the support 12 and the left column 13. The half molding assembly 20 is provided on the base 11 and between the support 12 and the right column 13. The half molding assembly 20A includes a half-circular member 21A and a pneumatic cylinder 22A contacting the half-circular member 21A for moving the half-circular member 21A. The half molding assembly 20 includes a half-circular member 21 and a pneumatic cylinder 22 contacting the half-circular member 21 for moving the half-circular member 21. The half-circular members 21, 21A may move toward each other form a circular mold 21B on the support 12. The circular mold 21B has a top opening 21C. The half-circular member 21A has a half sprue 23A and the half-circular member 21 has a half sprue 23. The half sprues 23A, 23 form a sprue 23B of the circular mold 21B.

The die 30 is provided on a central portion of the mounting member 14 and includes a block 31 at an end and a pneumatic cylinder 32 downward extending to upward or downward move the block 31.

The auxiliary device 40 is provided on an underside of the mount 10 and includes a lateral moving member 41 for moving the auxiliary device 40 toward the die 30 or away from the die 30, a lifting member 42 adjacent to the die 30, an L-shaped arm 43 provided on the lifting member 42 and configured to move upward or downward, and a shaping member 44 provided on an underside of the L-shaped arm 43 and having an arcuate groove 441. The auxiliary device 40A is provided on an underside of the mount 10 and includes a lateral moving member 41A for moving the auxiliary device 40A toward the die 30 or away from the die 30, a lifting member 42A adjacent to the die 30, an L-shaped arm 43A provided on the lifting member 42A and configured to move upward to engage with the die 30 or downward to disengage from the die 30, and a shaping member 44A provided on an underside of the L-shaped arm 43A and having an arcuate groove 441A.

In operation, the lifting members 42, 42A activate in synchronism to move the shaping member 44, 44A toward the block 31 and clamp the block 31 via the L-shaped arms 43, 43A. The shaping members 44, 44A and the block 31 together move downward to insert into the circular mold 21B. A piston ring 45 can be placed in the grooves 441, 441A.

The cooling device 50 is provided in the base 11 under the half molding assembly or the half molding assembly 20A for cooling the circular mold 21B in operation.

The lifting devices 60 are provided on two sides of a top of the mounting member 14 respectively. In operation, the lifting devices 60 activate to move the mounting member 14 downward along the columns 13 until the shaping members 44, 44A and the block 31 together insert into the circular mold 21B. Alternatively, the lifting devices 60 activate to move the mounting member 14 upward along the columns 13 to move the shaping members 44, 44A and the block 31 away from the circular mold 21B.

The lowering devices 70 are provided on two sides of an underside of the base 11 respectively. In an operation, the lowering devices 70 activate to lift the base 11 to finish the molding. After the molding, the lowering devices 70 activate to lower the base 11 to its inoperative position and the pneumatic members 22, 22A activate in synchronism to separate the circular mold 21B.

The control device 80 is electrically connected to the half molding assemblies 20, 20A, the die 30, the auxiliary devices 40, 40A, the cooling devices 50, the lifting devices 60, and the lowering devices 70 respectively. Thus, the control device 80 may open or close the half molding assemblies 20, 20A, lower or lift the die 30, move and lift or lower the auxiliary devices 40, 40A, and activate the cooling devices 50, the lifting devices 60, and the lowering devices 70 in a molding process.

Specifically, in the molding process molten metal is pouring into the circular mold 21B through the sprue 23B. Also, the cooling devices 50 activate to cool the circular mold 21B until a product 100 is finished. Thereafter, the pneumatic cylinder 32 activates to lift the die 31, the lowering devices 70 activate to lower the base 11 to its inoperative position, the pneumatic members 22, 22A activate in synchronism to separate the circular mold 21B, and the lifting devices 60 activate so that the lifting members 42, 42A may activate in synchronism to move the shaping member 44, 44A upward via the L-shaped arms 43, 43A. Finally, the product 100 can be removed.

Figure 21:
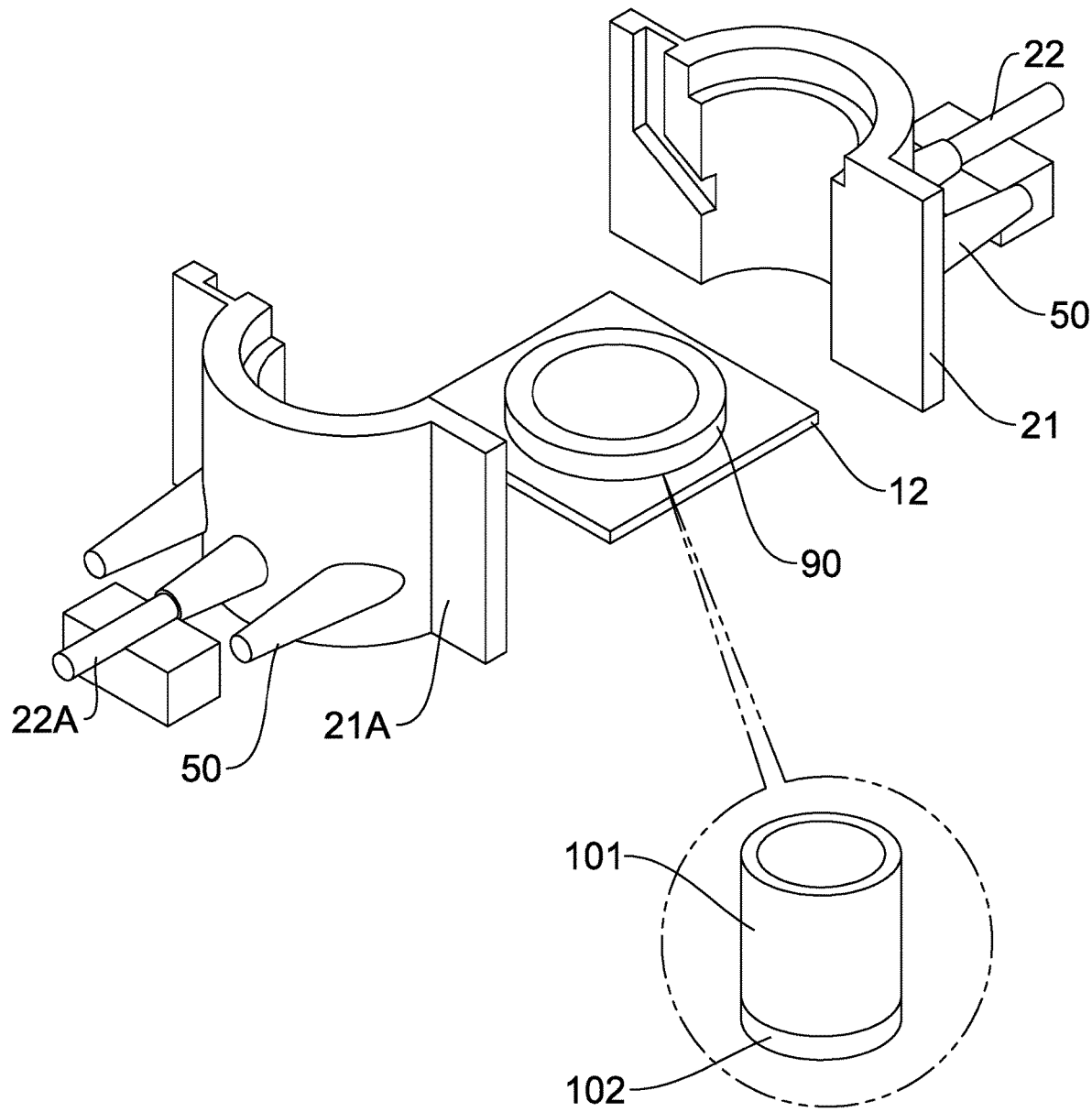
FIG. 21 schematically depicts a molding apparatus according to a second preferred embodiment of the invention.

Referring to FIG. 21, a molding apparatus in accordance with a second preferred embodiment of the invention is shown. The characteristics of the second preferred embodiment are substantially the same as that of the first preferred embodiment except the following: for manufacturing a piston 101, a wearing ring 90 is provided on the support 12. The wearing ring 90 can be clamped by the half-circular members 21, 21A so that a wearing part 102 can be formed on a lower portion of the piston 101.

A longer piston can be manufactured when a distance between the base 11 and the mounting member 14 is longer and a shorter piston can be manufactured when a distance between the base 11 and the mounting member 14 is shorter.

While the invention has been described in terms of preferred embodiments, those skilled in the art will recognize that the invention can be practiced with modifications within the spirit and scope of the appended claims.

What is claimed is:

1. A molding apparatus, comprising:
a mount including a base, a support disposed on a center of a top of the base, first and second columns disposed on two sides of the top of the base, and a mounting member moveably disposed on tops of the first and second columns;
a first half molding assembly disposed on the base and between the support and the first column, the first half molding assembly including a first half-circular member having a first half sprue, and a first pneumatic cylinder contacting the first half-circular member for moving the first half-circular member;
a second half molding assembly disposed on the base and between the support and the second column, the second half molding assembly including a second half-circular member having a second half sprue, and a second pneumatic cylinder contacting the second half-circular member for moving the second half-circular member wherein the first and second half-circular members are configured to move toward each other form a circular mold on the support, the first and second half sprues form a sprue of the circular mold, and the first and second pneumatic members are configured to activate in synchronism to separate the circular mold;
a die disposed on a center of the mounting member and including a block at an end and a pneumatic cylinder downward extending to upward or downward move the block;
a first auxiliary device disposed on an underside of the mount and including a first lateral moving member for moving the first auxiliary device toward the die or away from the die, a first lifting member adjacent to the die, a first L-shaped arm disposed on the first lifting member and configured to move upward to engage with the die or downward to disengage from the die, and a first shaping member disposed on an underside of the first L-shaped arm;

a second auxiliary device disposed on the underside of the mount and including a second lateral moving member for moving the second auxiliary device toward the die or away from the die, a second lifting member adjacent to the die, a second L-shaped arm disposed on the second lifting member and configured to move upward or downward, and a second shaping member disposed on an underside of the second L-shaped arm wherein the first and second shaping members and the block are configured to move into the circular mold;

first and second cooling devices are disposed in the base under the first half molding assembly and the second half molding assembly respectively for cooling the circular mold;

first and second lifting devices disposed on two sides of a top of the mounting member respectively wherein the first and second lifting devices are configured to move the mounting member along the first and second columns;

first and second lowering devices disposed on two sides of an underside of the base respectively wherein the first and second lowering devices are configured to lift or lower the base; and a control device electrically connected to the first and second half molding assemblies, the die, the first and second auxiliary devices, the first and second cooling devices, the first and second lifting devices, and the first and second lowering devices respectively.

2. The molding apparatus of claim 1, wherein the circular mold is open to a top.

3. The molding apparatus of claim 1, wherein the first and second shaping members each include an arcuate groove.

* * * * *